Figure 5:
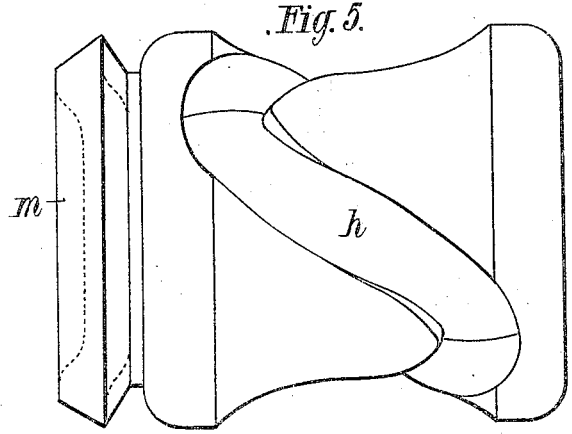

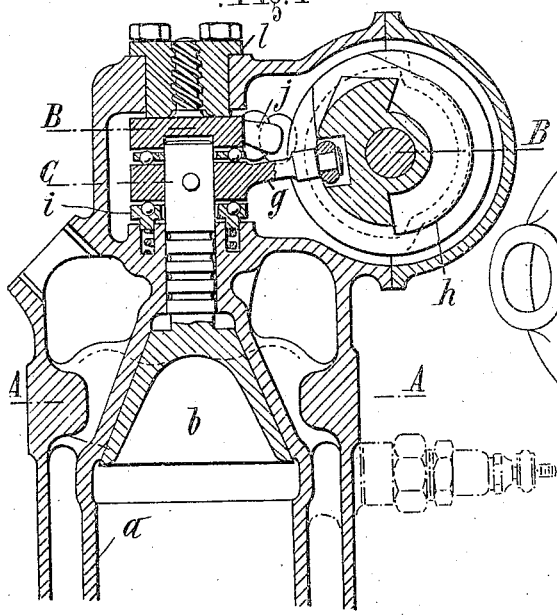
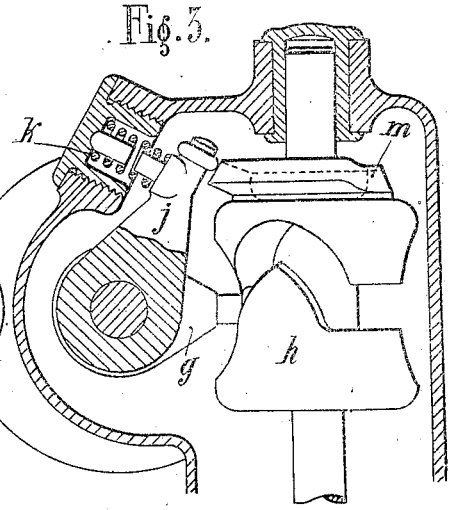
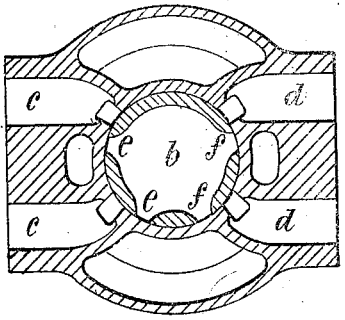
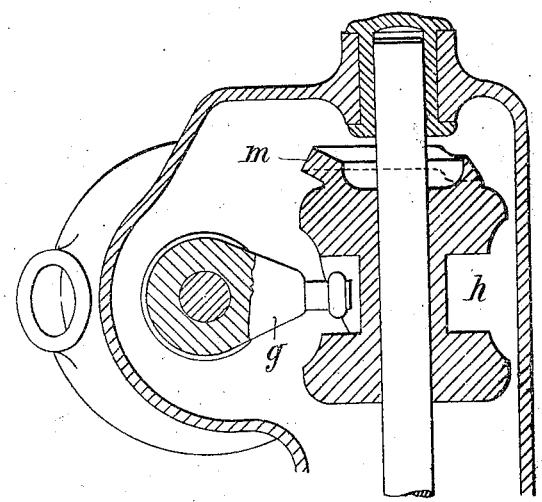

R. GUILLERY.
ADMISSION AND EXHAUST MECHANISM FOR ENGINES.
APPLICATION FILED MAR. 7, 1912.

1,134,124.

Patented Apr. 6, 1915.
6 SHEETS—SHEET 2.

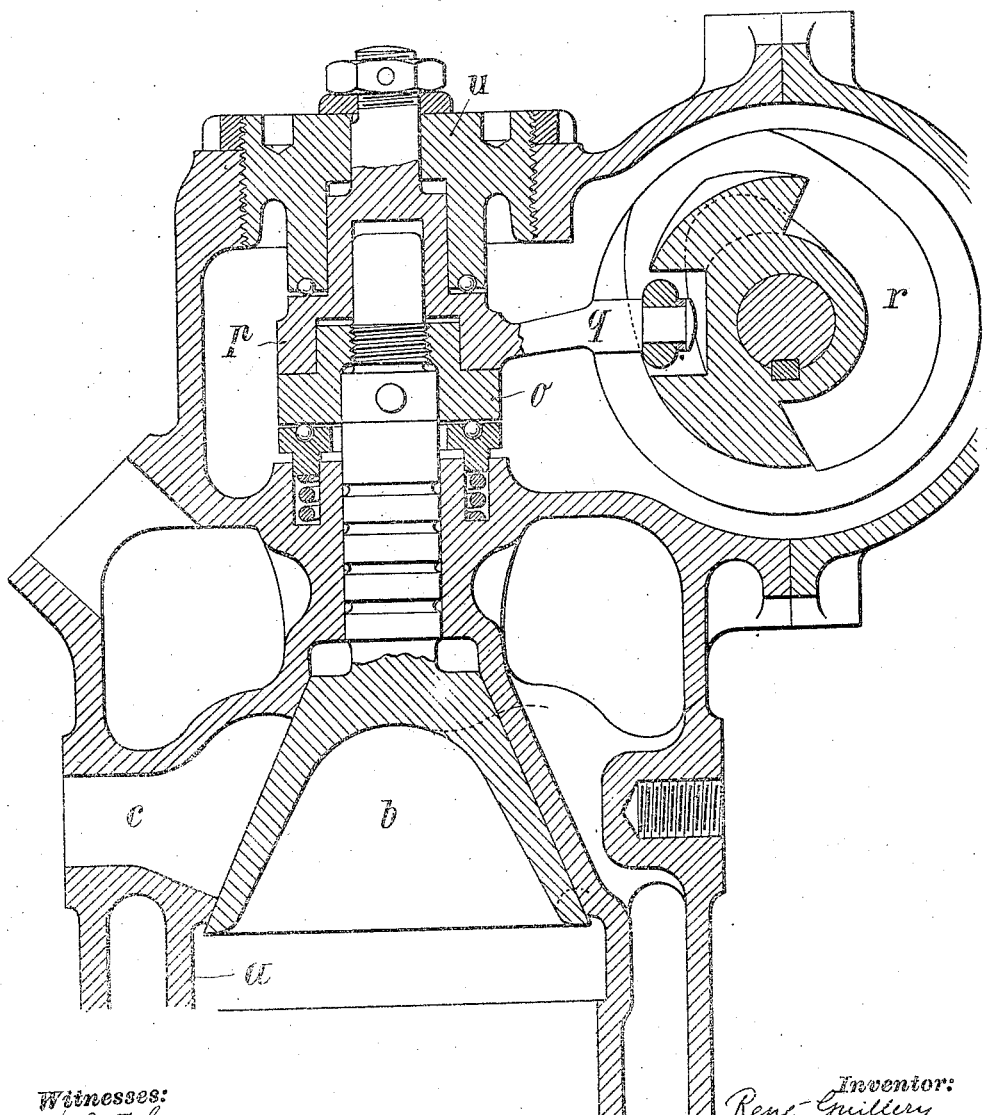

R. GUILLERY.
ADMISSION AND EXHAUST MECHANISM FOR ENGINES.
APPLICATION FILED MAR. 7, 1912.

1,134,124.

Patented Apr. 6, 1915.
6 SHEETS—SHEET 4.

Witnesses:
Inventor:
René Guillery
per
Lawrence Langner
Attorney.

R. GUILLERY.
ADMISSION AND EXHAUST MECHANISM FOR ENGINES.
APPLICATION FILED MAR. 7, 1912.

1,134,124.

Patented Apr. 6, 1915
6 SHEETS—SHEET 5.

Witnesses:
G. C. Schroder
A. Reynolds

Inventor:
René Guillery
per
Lawrence Langner
Attorney.

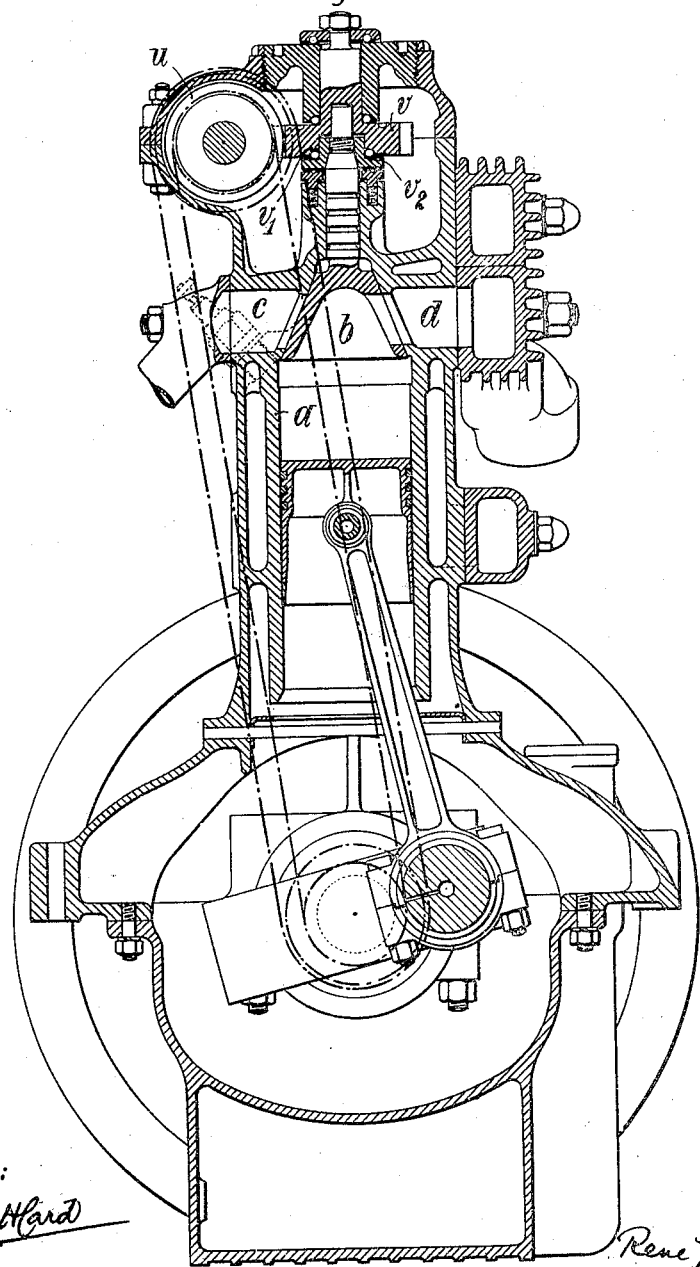

UNITED STATES PATENT OFFICE.

RENÉ GUILLERY, OF AUBERVILLIERS, FRANCE, ASSIGNOR TO SOCIETE DES ETABLISSEMENTS MALICET & BLIN, OF AUBERVILLIERS, FRANCE.

ADMISSION AND EXHAUST MECHANISM FOR ENGINES.

1,134,124.  Specification of Letters Patent.  Patented Apr. 6, 1915.

Application filed March 7, 1912. Serial No. 682,297.

*To all whom it may concern:*

Be it known that I, RENÉ GUILLERY, a citizen of the Republic of France, residing at 103 Avenue de la Republique, Aubervilliers, Seine, in the French Republic, have invented certain new and useful Improvements in the Admission and Exhaust Mechanism for Engines, of which the following is a specification.

This invention has for its object the provision of means whereby the combustion gases may be admitted to, and the products of combustion discharged from, the cylinder of an internal combustion engine in an efficient manner which avoids wire drawing and undesirable throttling due to a retarded opening of the full area of the admission or exhaust ports. To this end the engine cylinder is formed with a truncated conical end containing admission and exhaust ports, and there is provided within the cylinder a hollow ported truncated conical distributer seated in the truncated conical end of the cylinder. The admission and exhaust ports in the cylinder end and the corresponding ports in the distributer may be of any desired number and will be given sufficient area to freely admit the combustion gases and exhaust the products of combustion. The ports in the distributer may be brought into and out of registry with the admission and exhaust ports in the cylinder end by a reciprocating motion of angular displacement of the distributer or by continuance of the rotary movement of the distributer. In either case the distributer is provided with a stem extending through the cylinder head and connected with suitable mechanism for imparting to the stem the necessary angular displacement. For the purpose of insuring an adequate sealing contact of the distributer with its seat in the truncated conical end of the cylinder, under all conditions of pressure within the piston chamber, the distributer and its stem, which are free to have a limited axial movement without accompanying angular displacement, are associated with a pressure spring tending to force the distributer against its seat at all times; and in order to reduce when necessary the frictional engagement between the distributer and its seat, which friction may, under varying conditions of pressure and temperature, become such as to unduly impede the angular displacement of the distributer, means are provided for imparting to the distributer a slight axial movement which lifts it from its seat and reduces the said frictional engagement. This axial movement of the distributer may be produced intermittently, at proper intervals, by a mechanism which imparts to the distributer such an axial movement of definite extent regardless of the degree of opposition to angular displacement which is developed by the frictional engagement. In the preferred form of the invention, however, the arrangement is such that the axial movement of the distributer is brought about by a component of the turning effort applied to the valve stem. That is to say, the turning effort applied to the stem of the distributer is, by a suitable mechanism, divided into one component tending to impart angular displacement to the stem, and a second component at right angles to the first and tending to impart an axial movement to the stem and consequently to the distributer. If the resistance due to the frictional engagement between the distributer and its seat is less than that component of the applied force which is applied tangentially, then the distributer will be displaced angularly without axial movement; but if the resistance due to the frictional engagement exceeds the tangentially directed component of the applied force, then the axially directed component of that force will become effective to move the distributer very slightly in an axial direction until the resistance due to the frictional engagement is sufficiently reduced to permit the tangentially applied component of the force to effect the desired angular displacement.

The accompanying drawings show by way of example various means for carrying into practice the method forming the object of the present invention in its application to the control of a distributer for thermic motors.

Figure 6:
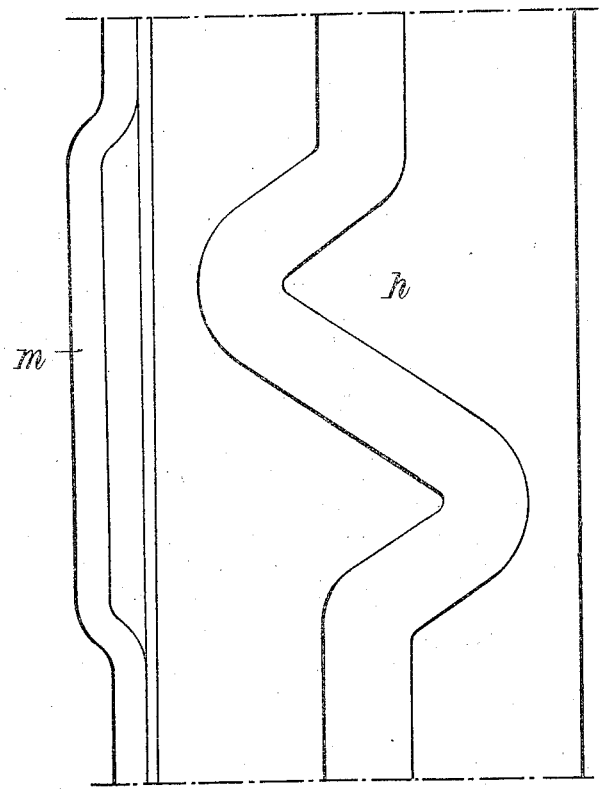
Figure 12:
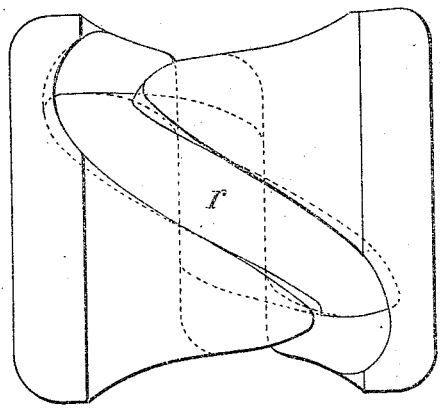
Figure 8:
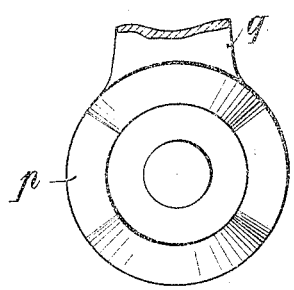
Figure 13:
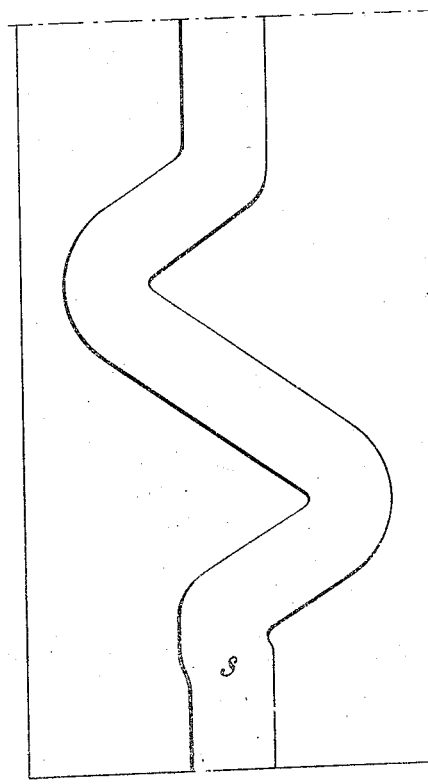
Figure 9:
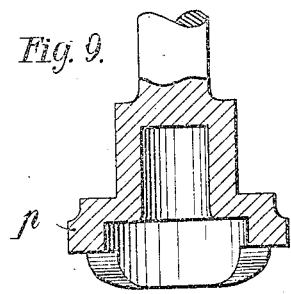
Figure 10:
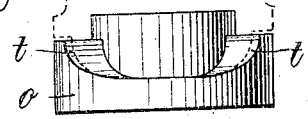
Figure 11:
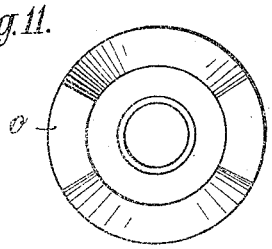
Figure 14:
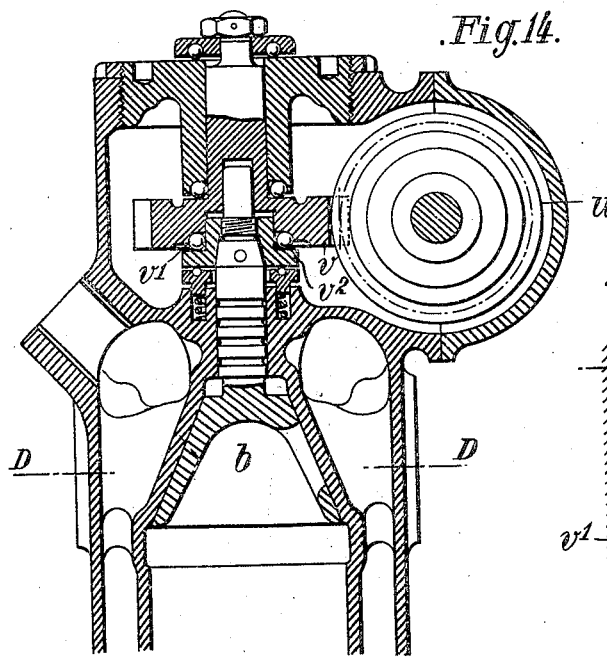
Figure 16:
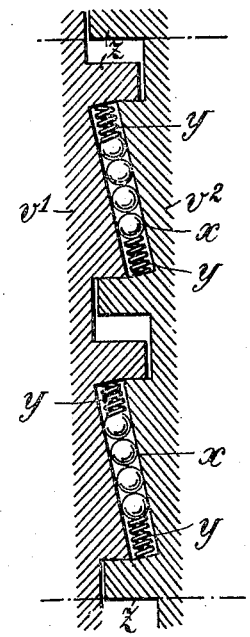
Figure 15:
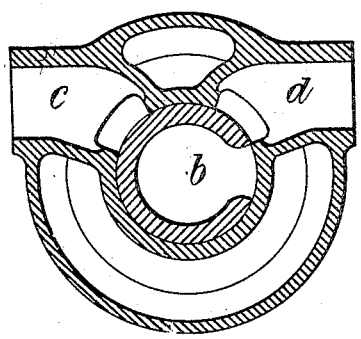

Figure 1 is a general vertical section showing a constructional form for the control of the conical distributer. Fig. 2 is a horizontal section on the line A A of Fig. 1. Fig. 3 is a horizontal section on the line B B of Fig. 1 showing the distributing elements and the operating cam in elevation. Fig. 4 is a horizontal section on the line C B of Fig. 1, showing the operating cam in section. Fig. 5 is an external view of the operating cam and Fig. 6 is a development of this cam. Fig. 7 is a vertical section corresponding to Fig. 1, but with a transmission mechanism which constitutes a simplified modification. Fig. 8 is an underneath plan of a driving claw. Fig. 9 is a corresponding vertical section. Fig. 10 is an external elevation of the corresponding claw. Fig. 11 is a corresponding plan thereof. Fig. 12 represents the operating cam. Fig. 13 is a development of its groove. Fig. 14 shows in vertical section a modification of the control mechanism of the distributer. Fig. 15 is a horizontal section on the line D, D in Fig. 14. Fig. 16 is a development of the inclines of the worm drive. Fig. 17 is a vertical section particularly showing the driving connection between the engine shaft and the distributer.

In the construction illustrated in Fig. 1, the cylinder $a$ ends at its upper part in a frusto-conical head into which the exhaust orifices $c$ and admission orifices $d$ open; any desired number of these may be provided. The distributer $b$ fits the frusto-conical head; its stem issues from the cylinder and it comprises ports $e$ for the exhaust $c$ and ports $f$ for the admission $d$. By a reciprocating movement of rotation this distributer $b$ is thus able to present its ports $e$ or $f$ in front of the exhaust orifices $c$ or admission orifices $d$ at the appropriate phases of the motor cycle. A lever $g$ is fixed to the stem of the distributer and is given a horizontal reciprocating movement by a globular cam $h$ in which a groove is formed appropriately to the phases of the cycle. A ball bearing $i$ is acted upon by a spring in such a manner as to provide a good joint for the distributer $b$ in the frusto-conical cylinder head which serves as its seat. At the upper part of the distributer stem a lever $j$ is arranged and is separated from the lever $g$ by a ball bearing. This lever $j$ carries a threaded rod which is housed in a nut $l$ fixed to the body of the cylinder and is subjected to the action of a lateral thrust spring $k$ (Fig. 3) which owing to its action in conjunction with that of the screw tends to cause the said lever $j$ to rise, its roller being displaced and guided by the extreme path $m$ of the cam (Fig. 5). The distributing gear as a whole is arranged in a gear case and suitably lubricated; the seat of the distributer $b$ need not be lubricated because as hereinafter explained its angular displacements take place after disengagement between the movable element and the cylinder head which forms the seat. The ignition takes place in the ordinary manner (by means of a sparking plug arranged on a boss on the cylinder $a$ for example) and the cooling water circulates around the stem and the seat of the distributer.

This device acts in the following manner. The cam $h$ is arranged in such a manner that it imparts no displacement to the distributer $b$ during the compression and expansion phases during which periods it is subjected to efforts directed parallel with its axis of rotation and which tend to wedge it in the cylinder head which serves as its seat. At the moment at which the distributer $b$ is to receive an angular displacement so as to uncover the exhaust orifices $c$ or the admission orifices $d$, the edge $m$ of the cam imparts to the lever $j$ a horizontal movement of oscillation which owing to the screw is transformed into a helicoidal movement causing it to be applied to the distributer $b$. The distributer is disengaged from its seat in such a manner that owing to its groove the cam $h$ can displace the lever $g$ thereby imparting to it the angular movement necessary for producing the corresponding phases of the distribution. When the cam $h$ has returned the lever $g$ to its initial position and the distributer $b$ is in the position for closing the admission orifices $d$ and the exhaust orifices $c$ the spring acts upon the lever $j$ so as to cause it to accompany the path $m$ of the cam $h$ which enables the said distributer $b$ to form a close joint with its seat. In this construction it will be noted that the distributer $b$ is disengaged periodically and at predetermined times having regard to the form of the groove in the cam $h$ and to the phase of the cycle by an active effort; this action is obtained by a mechanical control and by a special actuating member (the path $m$ of the cam $h$) suitably shaped with this object and acting so as to produce the disengagement prior to the angular displacement whatever the efforts exerted during the contact of the superposed walls may be.

In the construction illustrated in Fig. 7 the rod of the distributer $b$ is invariably connected with a claw $o$ and its extremity is housed in the bore of another claw $p$ carrying a lateral lever $q$. The upper extension of this claw $p$ turns in a plug $u$ adjustable in the cylinder and forming a stop. Ball bearings are arranged between the moving surfaces and facilitate the oscillations produced by the cam $r$. The fingers of the claw $o$ penetrate between the fingers of the claw $p$ leaving a progressive lateral clearance $t$ on each side and the groove in the cam $r$ is suitably formed (the portion $s$) for taking this play into account. The disengagement of the distributer $b$ is thus rendered automatic and is produced by a passive effort that is to say by the resistance opposed by the distributer $b$ to its angular displacement as a result of the wedging obtained by the efforts produced upon it during the compression and the expansion. When the lever $q$ acted upon by the cam $r$ begins its movement of oscillation the fingers of the claw p constitute inclined helicoidal planes relatively to the fingers of the claw o and if the value of the adherence between the distributer b and its seat is less than the tangentially directed component of the force applied through the lever q and the inclined planes of the claw p then the angular displacement of the distributer will occur at once; but if the value of the adherence between the distributer and its seat is greater than the tangentially directed component of the applied force, then the axially directed component of the applied force will impart to the claw o an axial movement which precedes the angular displacement. As soon as the friction of the distributer b upon its seat becomes smaller than the tangentially directed component resulting from the inclined planes, the distributer follows the lever in its movement. The same phenomenon is reproduced at both ends of the stroke that is to say at the maximum exhaust and maximum admission in a four-phase cycle; furthermore at the end of the admission and before it is locked the lever q experiences a small recoil movement which is produced by the portion s of the profile of the cam thereby canceling the vertical lift resulting from the action of the inclined plane. This small movement corresponds to the play existing between the fingers of the two claws p and o.

In the embodiment of the invention illustrated in Fig. 14 the movement of the distributer is continuous instead of being alternating and although in this construction the disengagement takes place under the action of a passive force it is conceivably possible to displace it vertically under the influence of an active effort and by the intermediary of a control analogous to that in Fig. 1. In this case the distributer b has a port which at the proper moment is presented in succession in front of the admission aperture c and the exhaust aperture d formed in the cylinder and this distributer is controlled by an endless screw u and a hollow wheel v. The endless screw u is rotated from the engine shaft by means of a chain or belt, as indicated in Fig. 17. The stem of the distributer b is provided with a helicoidal incline $v^2$ coöperating with a corresponding incline $v'$ formed beneath the hollow wheel v. Between these two inclines $v'$ and $v^2$ balls x are arranged and are held in place by springs y bearing between the noses z on the cams which limit the angle at which they are keyed relatively to each other. When the hollow wheel v rotates under the influence of the cam u it displaces the incline $v'$ with which it is integral. As this wheel v cannot move vertically it bears upon the interposed balls x and if the adherence between the distributer b and its seat is sufficient to oppose displacement, it presses back the balls x and the distributer b in separating it from its seat. This separation continues until the resistance to movement resulting from the wedging of the distributer b upon its seat becomes less than the effort tending to cause it to rotate which permits of the angular control of the said distributer b when the effort producing the rotation is equal to that causing the vertical displacement. If the effort tending to wedge the distributer b becomes greater than that which acts to produce its rotation (which is the case during the compression or the expansion) the distributer b is shifted relatively to its control because the operating inclines are reversible and the angular displacement can no longer be obtained until the said distributer has been disengaged as already described. The stops z of the inclines $v'$, $v^2$ are provided in order to prevent abnormal separation of the operating claws.

It is obvious that the description of the specific apparatus above referred to has been given by way of example only. It may, however, be pointed out that the invention is independent. (1) Of the nature of the circular or angular movement transmitted to the movable element which in the particular case of the distributer of thermic motors may be given a variable movement to permit of increasing the section of the orifices and of reducing the speed at the moment at which the internal pressures occur; (2). Of the form of the distributer, the angle of which may be more or less open and even equal to 180° the distributer then becoming plane and perpendicular to the shaft which imparts to it its angular displacements.

What I claim and desire to secure by Letters Patent of the United States is:—

1. The combination with a cylinder having a truncated conical end containing admission and exhaust ports, of a hollow ported truncated conical distributer seated in said cylinder end, a shaft forming a continuation of said distributer and extending through the cylinder cover, said shaft and distributer being mounted for limited axial movement, a pressure spring associated with and tending to move the distributer axially without angular displacement and against its seat, and means for angularly and axially displacing said shaft and distributer including inclined planes adapted to divide the applied turning effort into a tangentially directed component tending to angularly displace the distributer and an axially directed component tending to axially displace the distributer, whereby an axial displacement of the distributer occurs whenever the resistance to angular displacement exceeds the tangentially directed component of the applied force.

2. The combination with a cylinder having a truncated conical end containing admission and exhaust ports, of a hollow ported truncated conical distributer seated in said cylinder end, a shaft forming a continuation of said distributer and extending through the cylinder cover, said shaft and distributer being mounted for limited axial movement, a pressure spring associated with and tending to move the distributer axially without angular displacement and against its seat, and means for angularly and axially displacing said shaft and distributer including inclined planes adapted to divide the applied turning effort into a tangentially directed component tending to angularly displace the distributer and an axially directed component tending to axially displace the distributer, and antifriction balls between said planes whereby an axial displacement of the distributer occurs whenever the resistance to angular displacement exceeds the tangentially directed component of the applied force.

3. The combination with a cylinder having a truncated conical end containing admission and exhaust ports, of a hollow ported truncated conical distributer seated in said cylinder end, a shaft forming a continuation of said distributer and extending through the cylinder cover, said shaft and distributer being mounted for and tending to move the distributer axially without angular displacement and against its seat, and means for angularly and axially displacing said shaft and distributer including inclined planes adapted to divide the applied turning effort into a tangentially directed component tending to angularly displace the distributer and an axially directed component tending to axially displace the distributer, antifriction balls between said planes, stop lugs at the extremities of said planes, and positioning springs between the lugs and the balls, whereby an axial displacement of the distributer occurs whenever the resistance to angular displacement exceeds the tangentially directed component of the applied force.

4. The combination with a cylinder having a truncated conical end containing admission and exhaust ports, of a hollow ported truncated conical distributer seated in said cylinder end, a shaft forming a continuation of said distributer and extending through the cylinder cover, a plate fastened on said shaft and having inclined planes, a plate loosely mounted on said shaft and having inclined planes, a spring tending to hold the distributer to its seat, and means for angularly driving the loosely mounted plate, the inclined planes of the driven plate acting to angularly displace the distributer through the inclined planes of the fastened plate and to bring about an axial movement of the distributer against the stress of the spring when the resistance to angular displacement exceeds the tangentially directed component of the applied force.

5. The combination with a cylinder having a truncated conical end containing admission and exhaust ports, of a hollow ported truncated conical distributer seated in said cylinder end, a shaft forming a continuation of said distributer and extending through the cylinder cover, a plate fastened on said shaft and having inclined planes, a plate loosely mounted on said shaft and having inclined planes, anti-friction balls between said plates, a pressure spring associated with and tending to move the distributer axially without angular displacement and against its seat, and means for angularly driving the loosely mounted plate, the inclined planes of the driven plate acting through the balls to angularly displace the distributer through the inclined planes of the fastened plate and to bring about an axial movement of the distributer against the stress of the pressure spring when the resistance to angular displacement exceeds the tangentially directed component of the applied force.

6. The combination with a cylinder having a truncated conical end containing admission and exhaust ports, of a hollow ported truncated conical distributer seated in said cylinder end, a shaft forming a continuation of said distributer, and extending through the cylinder cover, a plate fastened on said shaft and having inclined planes, a plate loosely mounted on said shaft and having inclined planes, anti-friction balls between said planes, stop lugs at the extremities of said planes, positioning springs between the lugs and the balls, and means for angularly driving the loosely mounted plate, the inclined planes of the driven plate acting through the balls to angularly displace the distributer through the inclined planes of the fastened plate and to bring about an axial movement of the distributer against the stress of the pressure spring when the resistance to angular displacement exceeds the tangentially directed component of the applied force.

In testimony whereof I affix my signature in presence of two witnesses.

RENE GUILLERY.

Witnesses:
 LUCIEN MEMMINGER,
 GEORGES BORENCUIL.